2 Sheets—Sheet 1.
P. K. DEDERICK.
BALING PRESS.
No. 9,956. Reissued Dec. 6, 1881.
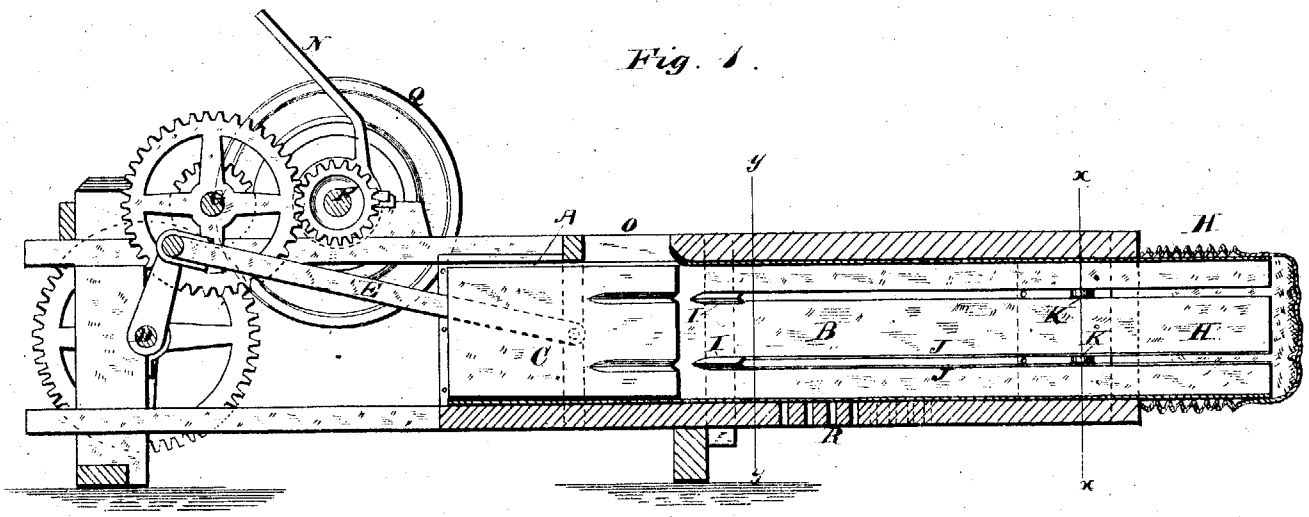
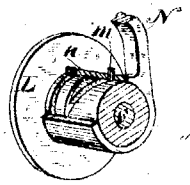
Attest,
W. H. H. Knight
W. Blackstock.
Inventor,
Peter K. Dederick
by L. Hill
Attorney.

P. K. DEDERICK.
BALING PRESS.
No. 9,956. Reissued Dec. 6, 1881.
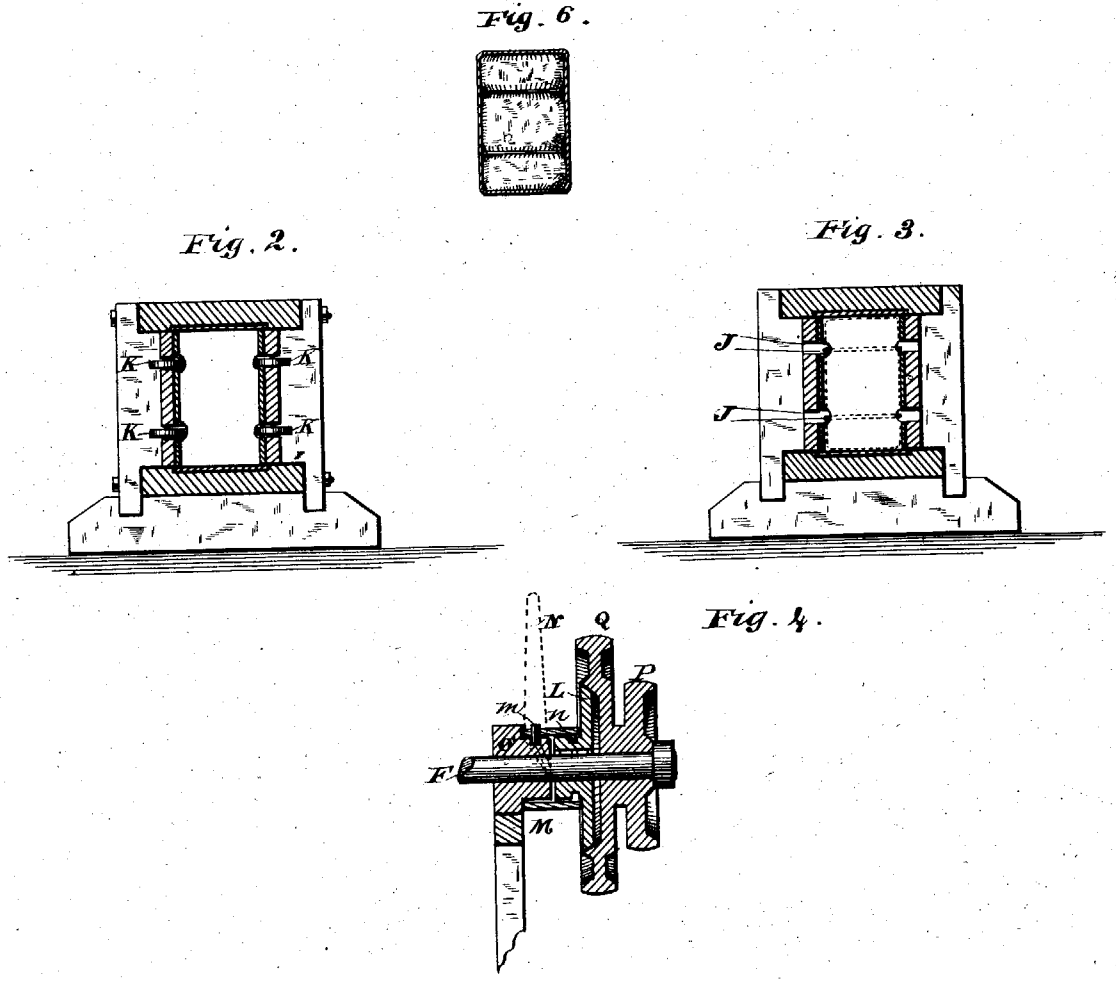
Attest,
W. H. H. Knight
W. Blackstock.
Inventor,
Peter K. Dederick
by L. Hill,
His Atty.

UNITED STATES PATENT OFFICE.

PETER K. DEDERICK, OF ALBANY, NEW YORK.

BALING-PRESS.

SPECIFICATION forming part of Reissued Letters Patent No. 9,956, dated December 6, 1881.

Original No. 214,282, dated April 15, 1879. Application for reissue filed November 6, 1879.

*To all whom it may concern:*

Be it known that I, PETER K. DEDERICK, of Albany, county of Albany, State of New York, have invented certain new and useful Improvements in Baling-Presses; and I do hereby declare the following to be a full and exact description of the same, reference being had to the accompanying drawings, forming part of this specification, in which—

Figure 1 represents a side elevation of a continuous baling-press with my improvements applied thereto. Fig. 2 is a sectional view taken in the line *x x*, Fig. 1. Fig. 3 is a similar view taken in the line *y y*, Fig. 1. Figs. 4 and 5 are views showing the band-wheel and balance-wheel and the shipping devices. Fig. 6 represents a completed bale of cotton with its sack or covering in section.

Similar letters of reference in the several figures denote the same parts.

This invention relates to improvements upon the continuous baling-presses for which Letters Patent were granted me October 29, 1872, No. 132,566, and No. 132,639, and No. 134,592, dated January 7, 1873, and various modifications of the same patented to me since such dates. Although it may be utilized on other classes of baling-presses, it will be described as applied to patented machines above alluded to.

The invention has for its object to better adapt said presses to the baling of cotton; and to this end it consists, first, in a new mode of compressing and sacking cotton or other loose fibrous material—to wit, by pressing the same into bales, tying the bales off in the bale-chamber, and forcing them directly into sacks.

It also consists in the combination, with a baling-press, of an elastic or expansible bale-conductor or sack-holder arranged and adapted to operate substantially as will be hereinafter described.

It also consists in extending the lining of the press beyond the discharge end of the bale-chamber to form an elastic or expansive sectional extension for the purpose of supporting and holding the sacks and serving as the funnel or conductor for the bales.

It also consists in the employment of ribs or projections within the press-box for forming grooves or depressions in the bales for the reception of the ties.

It also consists in the employment of rollers for pressing the ties into the grooves or depressions in the bales, whereby the bales are rendered smooth and even, so as to readily enter the inclosing-sacks and present a smooth and neat appearance when completed.

It also consists in a bale of cotton or other analogous material provided with grooves or depressions in those of its sides which are parallel to the direction in which the bale is pressed, and having ties or bands placed around it in the grooves aforesaid, so that said ties lie flush with or below the surface of the bale, and provided with an enveloping-sack, the embedding of the ties preventing them from projecting, so as to become knocked off or broken, or wearing holes in the sack, and the sack operating to keep the material of the bale clean and unexposed.

It also consists in arranging the driving-pulley and balance-wheel so that they may be thrown instantly in and out of connection with the shaft on which they are mounted.

It consists, lastly, in the combination of the various parts, all as I will now proceed to describe.

In the drawings, A represents the press-box; B, the bale-chamber; C, the reciprocating traverser, connected to the crank-shaft D by the pitman E; F, the driving-shaft; and G, an intermediate shaft geared to the driving-shaft, and also to the crank-shaft in the usual manner.

The parts thus far enumerated are all shown and described in my prior patents, and will not, therefore, require further description herein.

H represents the elastic or expansive bag-holder or funnel or conductor for holding and supporting the sack. Any conductor will answer the purpose which will permit the sack to be drawn over it and allow the bale to pass through and draw off the sack as the bale is ejected from the bale-chamber; but I find the most practical manner of constructing it to be to line the press throughout with sheet metal, preferably sheet-iron, and to extend said lining beyond the discharge end of the bale-chamber, as shown in Fig. 1. This insures an unobstructed passage for the bale, and the sack can be easily and quickly slipped over the end. As the bale emerges it draws the sack off from the extended lining or conductor and is itself gradually enveloped by the sack, as will be readily understood. It will be observed that as the bales are gradually ejected from the press-box in this class of presses they expand in all directions. The extension being formed of sheet metal and in sections yields to the expansion of the bale and expands with it, thereby filling and straining the sack tight, so as to produce frictional resistance, and thus prevent the sack from being drawn off in folds or wrinkles or too fast.

In baling cotton it is essential that the wires or ties which bind the bales shall lie below the surface, so as to enable the sack to be easily and readily applied, and to give the bale a smooth and finished appearance when completed. To accomplish this end I arrange projections I at the ends of the tying-slots in chamber or press-box, as shown in Fig. 1, or provide raised flanges J J on each side of the tying-slots throughout their entire length, as shown in Fig. 3, the function of such projections and flanges being to crease or groove the sides of the bale opposite the tying-slots, so that the ties may be embedded below the surface of the bale or lie flush therewith.

The projections or flanges may be used separately or together, as desired.

To still further insure the embedding of the ties I arrange wheels K K in each slot, near the discharge end of the bale-chamber, with their peripheries in line or a little within the inner surface of the lining, so that they will bear upon the ties, if they project at all, as the bale passes out and force said ties into their respective grooves.

It has been customary heretofore to provide the press-box with a perforated bottom, so that the dirt and trash pitched in with the material will be separated and screened out before pressing the material into bales. I have, however, found in practice that some of the dirt and trash is liable to follow the material into the bale-chamber. In order to provide for the removal of this portion also, I have perforated the lower wall of the bale-chamber, as seen at R, Fig. 1.

In baling cotton it is extremely desirable at times to instantly stop the pressing operation, and heretofore, with presses of this character, considerable difficulty has been experienced in effecting this result. I now propose to overcome the difficulty by mounting both the balance-wheel and the belt-pulley loosely upon the driving-shaft of the press, and employing a clutch by which to throw them simultaneously into or out of connection with the shaft at pleasure.

In carrying out this part of my invention I rigidly connect the belt-pulley P to the balance-wheel Q, or preferably construct them in one piece and mount them loosely upon the driving-shaft F, as shown in Fig. 4. For effecting the connection between the driving-shaft and the balance-wheel and pulley I prefer to employ a friction-clutch, and in Figs. 4 and 5 I have shown such a device, which is well adapted for the purpose. It consists of a friction-plate, L, arranged to slide longitudinally on the shaft, but prevented from turning thereon by a feather, a rotatable band or head, M, carrying a lever, N, and having projections *n*, which fit within a peripheral groove in the sliding friction-plate, and having also a pin or screw, *m*, which works in a spiral slot formed in a projection of the shaft-box O′. It is evident, from this construction, that by raising and lowering the lever the head M will be rotated and cause the sliding plate to be moved into and out of contact with the inner surface of the balance-wheel, and thus cause the balance-wheel and belt-pulley to be connected to or disconnected from the shaft. The periphery of the sliding plate is preferably beveled to fit a corresponding face on the balance-wheel, and thus increase the friction when the two are in contact. To further increase the friction, another plate may be firmly secured to the end of the shaft, with a friction-face adapted to engage with a corresponding friction-face on the belt-pulley, and the same operating device will serve to effect both connections, and thus double the friction; or, if desirable, the outer friction-plate, last described, may be used alone with the same operating devices.

Any other device for applying the friction may be substituted for the one shown and described without departing from the principle of my invention, as all that is necessary is to bring the friction-surfaces to bear by some means.

Heretofore the balance-wheels of my presses have been secured to their shafts by frictional contact; but no shipping devices were employed, and the object was merely to allow the wheels to slip in case of accident. By the above-described arrangement, however, the balance-wheel and belt-pulley can be simultaneously disconnected from the shaft and the pressing operation instantaneously stopped. In operation the power is applied to the belt-pulley, and the friction devices operated to connect the balance-wheel and pulley to the shaft, and thus start the press. The cotton is then fed into the press-box through the feed-orifice O, whence it is forced into the bale-chamber by the reciprocating traverser. The bales as they are formed are divided off in the usual manner in this class of presses, and bound through the slots in the sides of the bale-chamber. The projections and flanges within the press at each slot form the grooves in the bales for the ties, while the wheels at the outer end of the slots still further insure the embedding of said ties. The chamber being now filled with bales, they are gradually ejected as bales are formed at the other end of the chamber, and the bale being ejected expands within the sacking device, which, being in sections, expands with it, thus tightly filling and retaining the sack until crowded off by pressure of the bale in the end of the sack,

100. PRESSES,

Search Room when it will be smoothly drawn over the bale as it is ejected. Another sack is now put on the funnel and the operation repeated, and as each pressed and bound bale passes out of the press it draws off a sack from the extended lining, and is enveloped by said sack, as before described.

Having thus described my invention, what I claim as new is—

1. The herein-described mode of compressing and sacking cotton or other loose fibrous material—to wit, by pressing the same into bales, tying the bales off in the bale-chamber, and forcing them directly into sacks—substantially as described.

2. The combination, with a baling-press, of an elastic or expansible bale-conductor and sack-holder arranged and adapted to operate substantially as described.

3. In that class of presses for baling and sacking cotton or other loose fibrous material in which the bales are simultaneously and continuously formed and bound within and ejected from the bale-chamber, the lining of the press extended beyond the discharge end of the bale-chamber for the purpose of holding the sacks and serving as the conductor for the bales into the sacks, substantially as described.

4. In a baling-press in which the bales are tied off through slots in the sides of the bale-chamber, the tapered or pointed projections arranged at the ends of the tying-slots next the bale-chamber for forming creases or grooves in the bales to receive the ties, substantially as described.

5. In a baling-press, the combination, with the crease or groove forming projections at the ends of the tying-slots, of the flanges extending beyond said projections on both sides of the tying-slots, to assist in keeping open the creases or grooves made by said projections, substantially as described.

6. In a continuously-operating baling-press, rollers or wheels arranged in the tying-slots for embedding the ties in the bales, substantially as described.

7. In a baling-press, the balance-wheel and belt-wheel mounted loosely upon the driving-shaft, and adapted to be thrown into or out of connection with said shaft by means of a friction-clutch, in combination with the reciprocating traverser and connecting-gearing, whereby the pressing operation is enabled to be instantly stopped at will, substantially as described.

8. A bale of cotton or other analogous material provided with grooves or depressions in those of its sides which are parallel to the direction in which the bale is pressed, and having ties or bands placed around it in the grooves aforesaid, so as to lie flush with or below the surface of the bale, and provided with an enveloping-sack, substantially as described, for the purpose specified.

P. K. DEDERICK.

Witnesses:
R. J. VAN SCHOONHOVEN,
E. S. DEDERICK.